United States Patent
Malecot et al.

(10) Patent No.: US 6,874,642 B1
(45) Date of Patent: Apr. 5, 2005

(54) FILTERING ELEMENT MADE OF ABSORBENT PAPER MATERIAL IN THE FORM OF A TUBULAR CYLINDER

(75) Inventors: Yves Malecot, Crosville la Vieille (FR); Joel Hungler, Ailly (FR)

(73) Assignee: Georgia-Pacific France, Kunheim (FR)

( * ) Notice: Subject to any disclaimer, the term of this patent is extended or adjusted under 35 U.S.C. 154(b) by 0 days.

(21) Appl. No.: 09/744,946

(22) PCT Filed: Aug. 2, 1999

(86) PCT No.: PCT/FR99/01904

§ 371 (c)(1),
(2), (4) Date: Feb. 8, 2001

(87) PCT Pub. No.: WO00/07691

PCT Pub. Date: Feb. 17, 2000

(30) Foreign Application Priority Data

Aug. 4, 1998 (FR) .......................................... 98 09986

(51) Int. Cl.⁷ .............................................. B01D 27/04
(52) U.S. Cl. .................... 210/435; 210/489; 210/497.1; 210/500.29
(58) Field of Search ................................ 210/483–484, 210/488–491, 503, 508, 494.1, 497.01, DIG. 17, 497.1, 435, 387, 437, 443, 500.29; 493/941, 960

(56) References Cited

U.S. PATENT DOCUMENTS

| | | | | |
|---|---|---|---|---|
| 1,411,975 A | * | 4/1922 | Matson | |
| 2,512,797 A | * | 6/1950 | Harvuot | 210/494.1 |
| 2,955,067 A | * | 10/1960 | McBurney et al. | |
| 3,468,425 A | * | 9/1969 | Engstrom | |
| 3,504,803 A | * | 4/1970 | Brayman | 210/439 |
| 3,572,509 A | * | 3/1971 | Dexter | 210/130 |
| 3,646,882 A | * | 3/1972 | Keating | |
| 3,692,186 A | * | 9/1972 | Marzocchi | |
| 3,868,327 A | * | 2/1975 | Van Gilder et al. | 210/457 |
| 4,017,400 A | * | 4/1977 | Schade | 210/439 |
| 4,289,513 A | * | 9/1981 | Brownhill et al. | |
| 4,454,036 A | * | 6/1984 | Suzuki | 210/117 |
| 4,469,598 A | * | 9/1984 | White | |
| 4,487,378 A | * | 12/1984 | Kobayashi | 242/160.1 |
| 4,857,195 A | * | 8/1989 | Brownell et al. | |
| 4,869,820 A | * | 9/1989 | Yee | 210/316 |
| 5,013,434 A | * | 5/1991 | Furrow | |
| 5,030,345 A | * | 7/1991 | Thomas | 210/248 |
| 5,178,753 A | * | 1/1993 | Trabold | 210/130 |
| 5,413,712 A | * | 5/1995 | Gewiss et al. | |
| 5,552,065 A | * | 9/1996 | Meddock et al. | 210/808 |
| 6,106,928 A | | 8/2000 | Laurent et al. | |
| 6,319,416 B2 | * | 11/2001 | Morgan et al. | 210/767 |

FOREIGN PATENT DOCUMENTS

| | | | |
|---|---|---|---|
| FR | 2554799 | * | 11/1983 |
| FR | 2 624 397 A1 | | 6/1989 |
| GB | 2147821 A | * | 5/1985 |
| GB | 2150456 A | * | 7/1985 |
| WO | WO 96/05133 | * | 2/1996 |

* cited by examiner

Primary Examiner—Terry K. Cecil
(74) Attorney, Agent, or Firm—Breiner & Breiner, L.L.C.

(57) ABSTRACT

The invention relates to a filter system (10) including a filter element (14) for filtering a fluid within a cylindrical case (12). The filter element is an absorbent tissue paper material in the form of a sheet compactly wound to form inner winding turns therein and to form a tubular cylinder inside the case (12) in a manner to partition a radially outside part (26) from a radially inside part (30). The axial ends of the filter element are capped by the closed ends (18, 20) of the case. The inner winding turns exhibit a contour which prevents the inner winding turns from unraveling inward. In operation, the fluid moves across the filter element (14) in a generally centripetal direction. The filter element (14) is characterized in that it is devoid of a central core.

12 Claims, 2 Drawing Sheets

Figure 1:
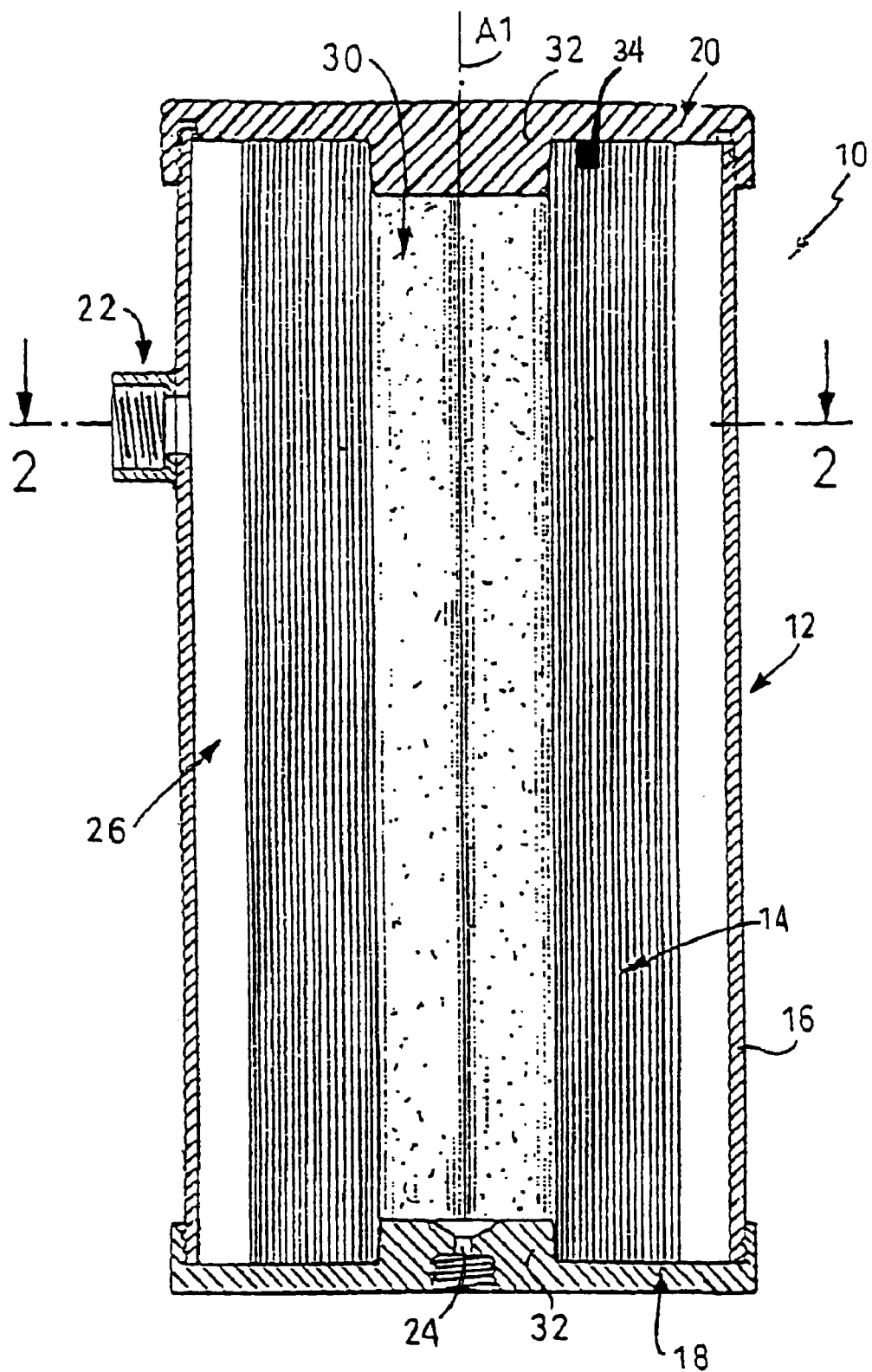

FILTERING ELEMENT MADE OF ABSORBENT PAPER MATERIAL IN THE FORM OF A TUBULAR CYLINDER

The present invention relates to a filter element.

More specifically, the present invention relates to a filter element for use in filtering a fluid and designed for use within a filtration system including a cylindrical case, the filter element being made of an absorbent paper material in the form of a sheet configured to subtend a tubular cylinder and being arranged within the case to partition an outer radial portion from an inner radial portion, the fluid moving across the filter element in a generally centripetal direction.

Such a filter element, illustratively, is described in French Patent Document 2,624,397 A.

This Document describes a filter element used in particular for ultrafine filtering lubrication oil of an automobile's internal combustion engine.

Such filter elements are designed to be housed in a case of a filter system which is entered by a fluid at its peripheral zone and which fluid leaves, following filtration through a central zone.

In French Patent Document 2,624,397 A, the filter element is made of a paper strip which is wound around a cardboard core, the core being perforated by an array of holes to pass the fluid. The oil must cross in one way or another the cardboard core to arrive at the outlet of the case.

Such filter elements offer many advantages. They are manufactured using techniques widely used, in particular, in making rolls of toilet paper or paper towels. Making the filter element in the form of a wound strip of paper is especially advantageous because of the ease in winding such a strip and the filtering quality is especially high and, moreover, can be customized as a function of the particular material being used and of its winding density.

Nevertheless, the filter element described in French Patent Document 2,624,397 A incurs a serious drawback by the presence of the cardboard core. It has been observed that this cardboard core entails a high pressure drop when the fluid moves through the filter element, in particular as regards such fluids as high viscosity oils.

It must be borne in mind that the cross-section allowing the fluid to flow through the filter is limited to the sum of the cross-sections of each fluid transmitting perforation in the cardboard core. However, in the device of the Patent Document, the transmitting cumulative cross-section is only a few percent of the total surface of the inner cylindrical surface of the wound paper.

Moreover, the perforations are relatively far from each other, and are relatively few, and as a result favored fluid transmission zones will be created, in particular and obviously near these perforations. Because some zones filter more oil than others, these zones will collect more particles than others in the filter element, and hence they will clog earlier.

When the favored fluid transmission zones become clogged, the filtration quality drops significantly, with an accompanying increase in the pressure drop across the filter element.

Consequently, a filter element fitted with a perforated central core often must be replaced prematurely without the global volume of the filter element having attained a clogging level that would justify such a replacement.

Therefore, it is an object of the present invention to propose a novel filter element which on one hand allows significant reduction of the pressure drop across the filter element and on the other hand allows increase in the filter element's service life by homogeneously exploiting its full volume.

Accordingly, the invention proposes a filter element of the above described kind which is characterized by the absence of a central core in the filter element.

In other features of the invention:

The mean inside diameter of the tubular cylinder is larger than $\frac{1}{20}^{th}$ its mean outside diameter, The mean inside diameter of the tubular cylinder is larger than $\frac{1}{4}^{th}$ its mean outside diameter, The mean inside diameter of the tubular cylinder is between $\frac{1}{3}$ and $\frac{1}{2}$ its mean outside diameter, The mean inside diameter of the tubular cylinder is larger than 25 mm, The inside wall of the tubular cylinder is conical or cylindrical and its cross-section is circular, polygonal or other, On its surface, the cylindrical filter element is fitted with at least one polarizing positioning means, The filter element has a strip of absorbing paper in the form of a single, continuous sheet wound into a tubular cylinder, The filter element has a series of interlacing absorbent paper sheets constituting a tubular cylinder, The sheet includes several plies, The absorbent paper product is made of cellulose cotton, It is designed to be used in a fluid filtering system, such as an oil filter of an automotive vehicle.

Other features and advantages of the invention are elucidated in the comprehensive discussion below and in relation to the attached drawings.

Figure 2:
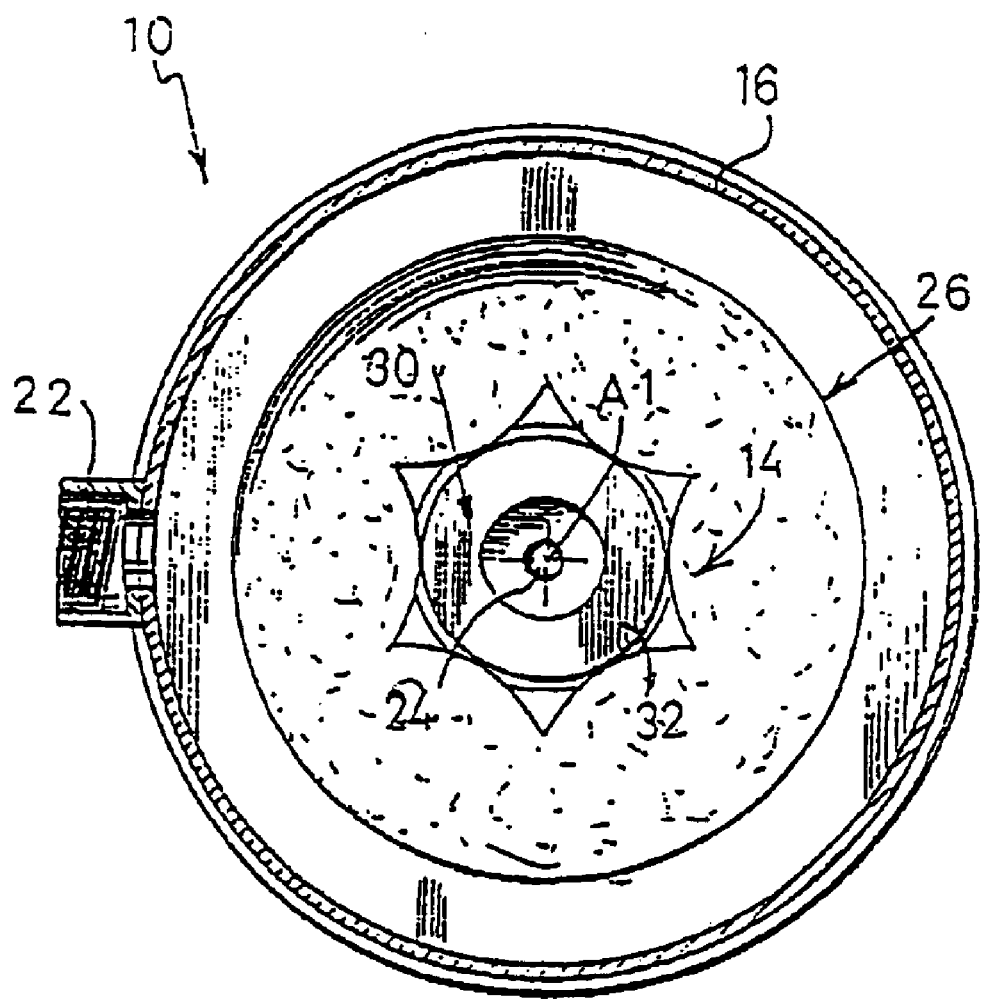

FIG. 1 is an axial and schematic section of a filter system fitted with a filter element of the present invention, and FIG. 2 is a schematic cross-section in the plane of line 2—2 of FIG. 1.

FIGS. 1 and 2 show a fluid filter system 10 substantially including a case 12 and a filter element 14. The case 12 is fitted with a cylindrical side wall 16 forming a body of revolution about the axis A1 and it is closed at its two axial ends by two lower and upper transverse lids 18 and 20. The lids 18, 20 are affixed to the axial ends of the side wall 16, for example by a screw connection or any other conventional means.

The casing 12 includes an intake 22 radially issuing into the side wall 16 so that a fluid may enter the inside of the case 12. The lower lid 18 is fitted at its center with an axially pointing orifice 24 constituting an outlet for the fluid after it has been filtered so that it can leave the case 12.

In the illustrated embodiment, the filter element 14 is a strip of paper, for example made of cellulose cotton, the strip being cylindrically wound about the axis A1 so as to substantially constitute a body of revolution about this axis, and, in the manner of the present invention, the cylindrical winding is devoid of any central core, as a result of which the inside wall of the filter element is constituted by the innermost turns of the wound paper.

The illustrated filter element therefore can be manufactured in the manner disclosed in the French Patent Document 2,544,7A which is explicitly referred to herewith for all details relating to the manufacture of this filter element. In summary, however, this procedure involves winding the paper strip around a conical or cylindrical bar of which the cross-section is circular, polygonal or other, or at least the cross-sections of the bar exhibit edges which run approximately parallel to the winding axis or subtend a simple or complex helix around the axis, the paper being folded at these edges. A compression roller is applied against the outside of the winding in progress and allows especially compact winding, and, when this winding bar exhibits edges in its cross-section, the compression roller neatly folds the paper where it makes contact with the edges.

In a simple embodiment of the invention, the winding bar exhibits the cross-section of a cylinder having a polygonal, for example a hexagonal, base.

The above illustrative embodiment is one of many. The invention includes winding bars of any other tubular shape, for example conical or cylindrical, and exhibits a circular or other cross-section.

Once winding has been terminated, the winding bar is retracted from the winding center, whereby the inside wall of the winding then exhibits a contour substantially as shown in FIG. 2, wherein this inside wall is constituted of convex surface segments joined by turning points having the folding marks imparted by the edges of the winding bar.

On account of this contour and on account of these turning points, the inner winding turns are prevented from unraveling inward, so that, even when unconstrained, the filter element retains its shape. The inside wall, of which the cross-section is defined by the winding bar, moreover may be reinforced in the manner described below.

As shown in FIG. 1, the filter element 14 is configured in the case 12 in a manner that its two axial ends axially rest one against the lower lid 18 and the other against the upper lid 20, whereby, inside case 12, the filter element 14 defines two zones, namely a peripheral, outer zone 26 and a radial, inner zone 30, the zone 30 being radially bounded outward by the inside wall of the filter element's winding.

Accordingly, the fluid entering the case through the intake 22 reaches the inside of the external, peripheral zone 26. The outlet 24 issues into the inner, radial portion 30. Therefore, in order to exit the case 12, the fluid that has entered it perforce must cross the filter elements in substantially radially inward manner.

When manufacturing the filter element by the procedure disclosed in French Patent Document 2,554,799 A, windings having a mean inside diameter of about 25 to 40 mm may be made, that is, a diameter which is substantially equal to that of the windings made on a core.

Advantageously, the mean inside diameter of the filter element's winding is larger than $1/20^{th}$ the outside diameter of the winding, and preferably this mean inside diameter greater than $1/4^{th}$ the outside diameter of the winding, and most preferably this mean inside diameter is between $1/3$ and $1/2$ the winding's outside diameter.

In fact, the inside diameter must be large enough to preclude the inside surface from being too small, there being danger that the inside radial part 30 will exhibit insufficient cross-section for adequate fluid flow and on the other hand there being danger that a small surface of the winding's inside wall entails a strong fluid pressure gradient near the inner turns of the windings.

In fact, fluid flow taking place radially inward, the flow per unit area increases when approaching the axis of the winding and hence the surface of the cylindrical surface at a given radius will decrease.

If the winding's inside diameter is too small, the core-less filter element will entail the same drawbacks regarding pressure drops as a filter element fitted with a perforated cardboard core.

The product made by the procedure described in French Patent Document 2,554,799 exhibits an inner wall having a polygonal cross-section whereby the filter element can be advantageously locked in place in a case without danger of its rotating inside it and in this manner assures simple affixation of this element. As shown in the Figures, this securing feature is easily implemented by centering the filter element in the case. Illustratively, these filtering elements may be in the form of centering stubs 32 which project from the inside faces of the lids 18, 20 and which run axially within the inside radial portion 30 of the filter element while cooperating with the element's inside wall by means of their slightly conical side walls.

The cross-section of the inside wall is defined by the winding bar and this wall also may be reinforced to totally preclude any warping by application of water or a solution containing an adhesive or any other additive at least at the beginning of winding the paper strip in the manner discussed in French Patent Document 2,554,799. The inside wall may be further reinforced by knurling or any other method linking the turns. In this manner, the inside wall of the filter element may be rigidified while preserving its permeability to liquids. The paper (in this instance cellulose cotton) remains absorbent.

The filter element furthermore may be fitted at its outside surface with polarizing positioning means 34 which are small salient or hollow devices to position the filter element in a manner that it assumes a defined position within the case. These polarizing positioning means 34 also may be notches, grooves or studs. They are configured on one or several surfaces of the filter element and preferably are situated on the cylindrical outside surfaces.

One application of a filter element of the invention concerns micro-filtration of oil of an automotive internal combustion engine in order to trap the microparticles which are a predominant source of engine generated pollution. Illustratively, applicant has made in particular three different kinds of filter elements of different sizes for such an application. The approximate dimensions of these three kinds of filter elements are shown in the Table below.

| Outside Diameter (mm) | Inside Diameter (mm) | Inside Surface (cm$^2$) | Axial Length (m) | Strip Length (m) | Weight (g) |
|---|---|---|---|---|---|
| 72 | 28 | 135 | 152 | 47 | 139 |
| 84 | 35 | 230 | 210 | 62.5 | 256 |
| 84 | 35 | 300 | 273 | 62.5 | 332 |

In this case, the paper material is a strip of a single ply of cellulose cotton with a specific surface weight of 20 g/m$^2$.

This embodiment of the invention uses cellulose cotton, however other types of paper materials may be considered, for example products of paper fibers linked by latex or hot melting fibers when using a dry method.

Be it borne in mind that cellulose cotton offers moisture resistance because its manufacture includes a moisture-resistant agent.

Again, a strip of paper including several identical or different plies may be used, and sheets of other specific surface weights may be used as a function of the fluid being filtered, or as a function of flow or of the desired filtration.

Moreover, the filter element is not mandatorily in the form of a winding resulting from a single and continuous sheet of absorbent paper. The filter element also may be built using a series of sheets of absorbent paper which are configured in the manner of the disclosure of the document WO 96/05133. This document describes a manufacturing process for a paper roll involving interlacing sheets of paper.

Paper rolls including sheets which are superposed and/or combined, for example by bonding, embossing and/or knurling also are applicable.

The manufacture of such papers may incorporate agents which are resistant to the fluids being filtered in order to enhance sheet strength during filtration.

Additives also may be used as a function of filtration purposes such as cleansing, bactericidal action or enrichment of the filtered and recovered fluid, by incorporating a dehydrating agent, food supplements (in the case of filtering food oils), etc.

One or more components directly or indirectly affecting the properties of the filtered fluid also may be applied to or fixated on at least the surface of the filter element's inside wall.

It is understood furthermore that a filter element of the present invention may be used to filter any generic oil and even any kind of fluid (gases included). Such applications relate, for example to engine oils, hydraulic oils, cooking oils, ect.

What is claimed is:

1. A filter system for filtering a fluid comprising:
   a cylindrical case comprising (i) a cylindrical sidewall extending about a central axis and having closed axial ends, and (ii) an inlet and an outlet; and
   a filter element in the form of a tubular cylinder axially positioned within said case such that axial ends of said filter element are respectively capped by said closed axial ends and the interior of the case is partitioned by said filter element into an inner radial part and an outer radial part; said filter element comprising an absorbent tissue paper material in sheet form compactly wound to form inner winding turns therein and to form said tubular cylinder, said inner winding turns exhibiting a contour which prevents the inner winding turns from unraveling inward, said filter element being devoid of a central core,
   said inlet communicating with said outer radial part and said outlet communicating with said inner radial part such that fluid to be filtered flows in a centripetal direction from said outer radial part across said filter element and into said inner radial part.

2. The filter system as claimed in claim 1 wherein the tubular cylinder has a mean inside diameter greater than $\frac{1}{20}$ of a mean outside diameter of the tubular cylinder.

3. The filter system as claimed in claim 2 wherein the mean inside diameter is greater than $\frac{1}{4}$ the mean outside diameter.

4. The filter system as claimed in claim 3 wherein the mean inside diameter is between $\frac{1}{3}$ and $\frac{1}{2}$ the mean outside diameter.

5. The filter system as claimed in any one of claims 1, 2, 3 or 4 wherein the mean inside diameter cylinder is greater than 25 mm.

6. The filter system as claimed in claim 1 wherein the tubular cylinder has an inside wall which is conical or cylindrical in shape and has a circular or polygonal cross-sectional shape.

7. The filter system as claimed in claim 1 wherein the filter element further comprises at least one polarizing positioning means.

8. The filter system as claimed in claim 1 wherein said absorbent tissue paper material is a strip which is a continuous single sheet wound to provide the tubular cylinder.

9. The filter system as claimed in claim 1 or 8 wherein the sheet comprises several plies.

10. The filter system as claimed in claim 1 wherein said absorbent tissue paper material is comprised of a series of sheets which are interlaced to provide the tubular cylinder.

11. The filter system as claimed in claim 10 wherein each sheet of said series of sheets comprises several plies.

12. The filter system as claimed in claim 1 wherein the filter system is constructed and arranged to filter automotive engine oil.

* * * * *